United States Patent
Galvin et al.

(10) Patent No.: US 6,393,017 B1
(45) Date of Patent: May 21, 2002

(54) VIRTUAL PBX SYSTEM

(75) Inventors: Thomas J. Galvin, Hiawatha; Michael C. Kirchner, Cedar Rapids; Anthony W. S. Moey, Coralville; Mark J. O'Brien, Hiawatha; Joel K. Hanson, Anamosa, all of IA (US)

(73) Assignee: WorldCom, Inc., Clinton, MS (US)

( * ) Notice: Subject to any disclaimer, the term of this patent is extended or adjusted under 35 U.S.C. 154(b) by 0 days.

(21) Appl. No.: 09/441,741

(22) Filed: Nov. 17, 1999

(51) Int. Cl.[7] .................. H04L 12/66; H04L 12/28; H04M 1/66
(52) U.S. Cl. ............ 370/352; 370/397; 370/409; 379/201.01
(58) Field of Search .................. 370/352, 356, 370/389, 410, 475, 427, 397, 422, 259, 409; 455/411, 413; 379/201.01, 196, 154

(56) References Cited

U.S. PATENT DOCUMENTS

| | | | | |
|---|---|---|---|---|
| 4,764,919 A | * | 8/1988 | Hunter et al. | 370/259 |
| 4,896,319 A | * | 1/1990 | Lidinsky et al. | 370/427 |
| 5,233,607 A | * | 8/1993 | Barwig et al. | 370/397 |
| 5,742,596 A | * | 4/1998 | Baratz et al. | 370/356 |
| 6,018,570 A | * | 1/2000 | Matison | 379/201 |

OTHER PUBLICATIONS

Virtual PBX, pp. 1–3, Nov. 12, 1999.

* cited by examiner

Primary Examiner—Alpus H. Hsu
Assistant Examiner—Afsar M. Qureshi

(57) ABSTRACT

A virtual private branch exchange (PBX) system that routes calls within a packet-switching network. Login information is received from a data device. The login information includes an alias identifying a user at the data device and a network address identifying the location of the data device on the packet-switching network. The virtual private branch exchange system associates the user's private branch exchange extension with the network address and routes calls to the user's (PBX) extension to the data device on the basis of the network address of the data device.

27 Claims, 9 Drawing Sheets

200

Extension Aliases

| 202 Alias | 204 Group ID # | 206 User Extension |
|---|---|---|
| Joe.doe.Bxx.com | 299 | 1234 |
| ... | ... | ... |
| ... | ... | ... |
| ... | ... | ... |
| ... | ... | ... |
| Doe.joeyy.edu | 344 | 7890 |

Extension Locations

| 302 Group ID # | 304 User Extension | 306 Location Order | 308 Location |
|---|---|---|---|
| 299 | 1234 | 1 | Packet Network |
| 299 | 1234 | 2 | 555-111-2222 |
| ... | ... | ... | ... |
| 344 | 7890 | 1 | Packet Network |

FIG. 3

VIRTUAL PBX SYSTEM

BACKGROUND OF THE INVENTION

1. Field of the Invention

The present invention relates generally to a telephony system, and more specifically to a virtual private branch exchange (PBX) system for a packet-switching network (PSN).

2. Discussion of the Background

A PBX is an automatic telephone switching system that enables users within an organization to place calls to each other without having to access a public switched telephone network (PSTN). Users can also place calls to outside numbers via the PBX. PBXs are typically located on the premises of a customer and provide a great deal of control and flexibility in the customer's communications. PBXs are well known and are described, for example in Stallings, "Data and Computer Communications," $4^{th}$ Edition, MacMillan Publishing Co., New York, 1994, which is incorporated herein by reference.

One approach to implementing a PBX involves a virtual PBX call processing method in which a packet switching system establishes a virtual circuit between each distinct pair of user packet stations in a group. The user packet stations exchange signaling packets via the virtual circuits and respond to such packets by coordinating the initiation and disconnection of voice, data, or image calls. All call processing, including the provision of features, such as call forwarding and automatic call back, is accomplished by the stations without the aid of the switching system. Thus, all of the intelligence of the system is on the terminal side of the system and not on the network side. Consequently, telephony agents and terminals are required to process inbound and outbound calls and perform routing. No dynamic tracking of locations is performed by this system, and all of the terminal locations are static.

Methods of using Internet based communication standards for telephone communication have been developed for use with conventional PBXs. These methods simply (1) permit remote telephone access to an existing PBX system via a PSTN and (2) link Internet Protocol (IP) telephony clients to an existing PBX system via an H.323 gateway. h.323 is an ITU (International Telecommunications Union) standard that provides a set of specifications for equipment and services for use with multimedia communications over a network. An example of how IP telephony clients are linked to an existing PBX system via to: an H.323 gateway is described in http://quicknet.net/support/AppNotes/AN00004.htm, which is incorporated herein by reference. However, such systems still incorporate a conventional PBX, which handles call referencing and switching.

SUMMARY OF THE INVENTION

Accordingly, one object of this invention is to provide a virtual PBX system for a packet-switching network (PSN), where the intelligence of the virtual PBX system is located in the network rather than in the terminals.

It is another object of the present invention to provide a PBX system for a PSN that does not require telephony equipment.

It is yet another object of the present invention to track locations of users of the virtual PBX system in real time so that users are not required to maintain static locations.

It is still yet another object of the present invention to track users' locations for call and message delivery each time a user connects to the PSN.

It is still a further object of the present invention to provide connectivity between the virtual PBX system of the present invention and existing public switched telephone networks (PSTNs) and existing PBX systems.

These and other objects are achieved according to the present invention by providing a novel method, system, computer program product, and data structure in which login information is received from a data device. The login information includes an alias identifying a user at the data device and a network address identifying the location of the data device on the PSN. The user's PBX extension is associated with the network address of the data device, and calls are routed to the user's PBX extension to the data device on the basis of the network address of the data device. In this manner, a virtual PBX system for a PSN is implemented. Advantageously, the intelligence of the virtual PBX system is located in the network instead of in the terminals (e.g., the data device).

Preferably, information that uniquely identifies a user is linked to the user's PBX extension. As a result, the virtual PBX system of the present invention does not require conventional telephony equipment to route calls.

The location of the user can be dynamically tracked by storing the network address of the data device when the user logs onto the PSN with the data device. If the user logs onto and off of the PSN with different data devices, then the inventive virtual PBX system is able to track the location of the user by dynamically storing the network address of the data device that is currently connected to the PSN under the user's alias. When the user disconnects from or logs off of the PSN, the virtual PBX system disassociates the network address of the data device that is being disconnected from the PBX extension of the user. Preferably, the network address of the data device is an Internet Protocol (IP) address.

Additionally, known gateways provide connectivity between the virtual PBX system of the present invention and existing PSTNs and existing PBX systems. Thus, the virtual PBX system can complement, or be used independently of, conventional telephony networks.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is a drawing of an extension aliases record for associating each user's alias with a group identification (ID) number and a user extension, utilized in the system of FIG. 1;

FIG. 3 is an extension locations record for associating a user's group ID number, user extension, and sorting, in order of preference, various locations for each user to receive calls, utilized in the system of FIG. 1;

DETAILED DESCRIPTION OF THE PREFERRED EMBODIMENTS

Figure 1:
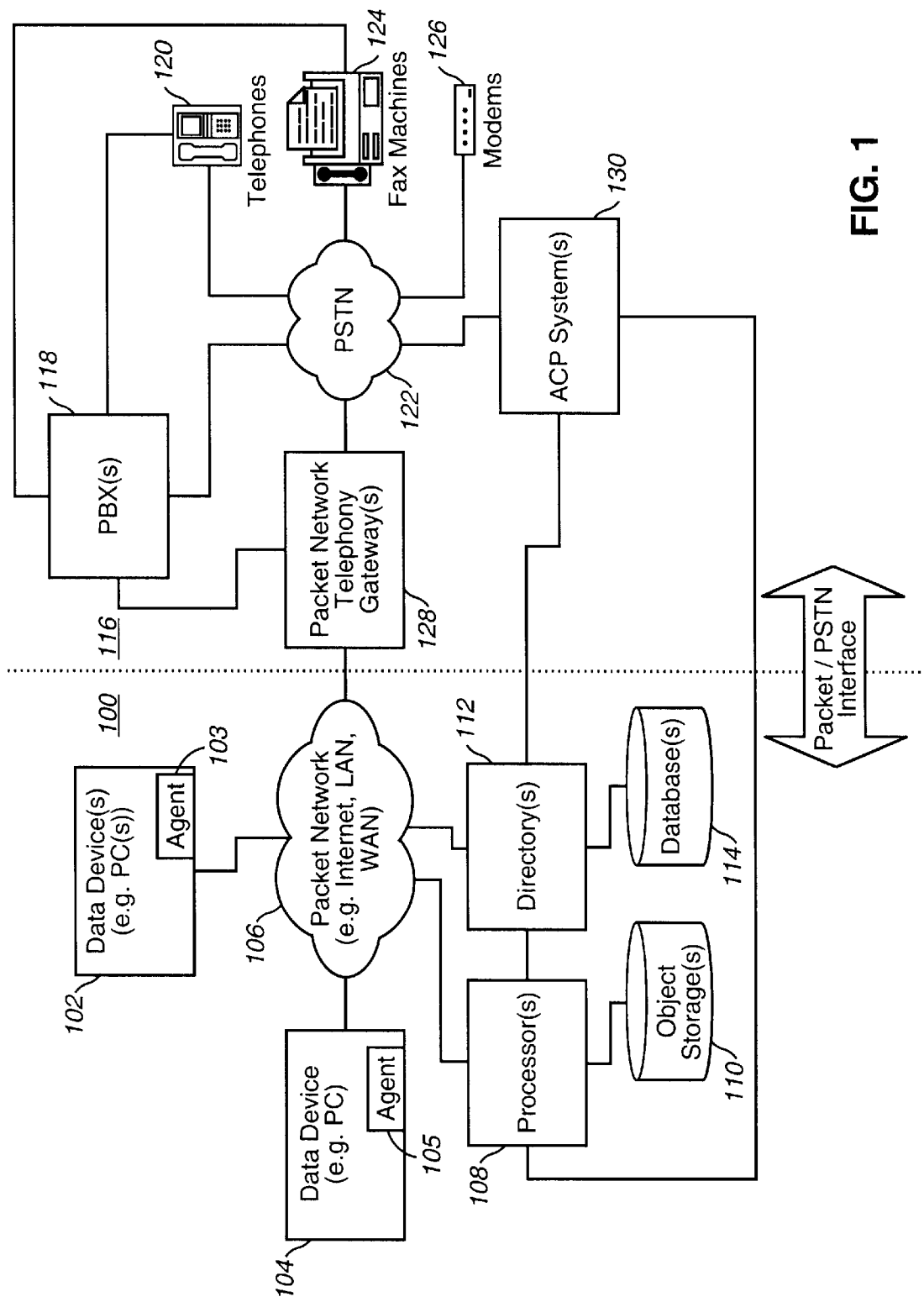
FIG. 1 is a schematic illustration of an embodiment of a virtual PBX system that complements a standard telephony network.

Referring now to the drawings, wherein like reference numerals designate identical or corresponding parts throughout the several views, and more particularly to FIG. 1 thereof, there is shown a virtual PBX system 100 that interfaces with a standard telephony network 116. The virtual PBX system 100 includes data devices 102 and 104, a packet-switching network 106, one or more processors 108, one or more object storage databases 110, one or more directories 112, and one or more databases 114.

The data devices 102 and 104 can be personal computers, palmtop computers, laptop computers, or any other terminal, endpoint, or device suitable for transmitting and receiving data (e.g., voice data) over a packet-switching network (PSN). The data devices 102 and 104 preferably include microphones and speakers or other suitable equipment for sending and receiving voice messages over the packet-switching network 106. The data devices 102 and 104 may also be portable devices for wireless communication with the packet-switching network 106 and for sending and receiving voice data over a PSN.

The data device 102 includes an agent 103, and the data device 104 includes an agent 105. The agents 103 and 105 are software (e.g., Web browser software) or circuitry for allowing users to send and receive voice packets through the data devices 102 and 104, respectively, to the packet-switching network 106. Such agents (also called telephony agencies) are known. An example of an agent is MICROSOFT NETMEETING. Also, agents are described in U.S. Pat. No. 5,867,494 to Krishnaswamy et al., entitled "System, Method and Article of Manufacture With Integrated Video Conferencing Billing in a Communication System Architecture," which is incorporated herein by reference. Preferably, the agents 103 and 105 provide a graphical user interface for visually representing to a user various programs, files, and options for initiating and receiving calls, accessing user options, and accessing message options, for example. User and message options are described below in conjunction with FIG. 6.

The packet-switching network 106 is any suitable network for relaying or transmitting packets, such as the Internet, a portion of the Internet, a backbone network, a local area network (LAN), or a wide area network (WAN). Packet-switching networks are known and are described, for example, in Keiser and Strange, "Digital Telephony and Network Integration," 2nd ed., Chapman & Hall, New York, 1995, which is incorporated herein by reference. The packet-switching network 106 connects the data devices 102 and 104 as well as the processor 108 and the directory 112. Thus, the processor 108 and the directory 112 may form a portion of the packet-switching network 106. The packet-switching network 106 may operate independently of a conventional PSTN or, as shown in FIG. 1, the packet-switching network 106 can be interfaced to a PSTN through a gateway such as the packet network telephony gateway 128.

The processor 108 is any device suitable for interpreting and executing instructions, such as a general purpose computer, a server, or dedicated circuitry. The processor may also be implemented with software such as Web server software that serves to clients (e.g., the data devices 102 and 104) pages with information retrieved from the object storage database 110 and/or the directory 112, for example.

The processor 108 receives information regarding calls to be made to and from the data devices 102 and 104. The information received includes information identifying locations of users (e.g., IP addresses of the data devices 102 and 104, user's PBX extensions, and/or e-mail addresses) and the telephone number and/or extensions of the originators of outgoing calls and the recipients of incoming calls.

The processor 108 and the directory 112 may be implemented separately or on a single computer, for example. In one embodiment, a single processor 108 is physically separate and implemented separately from multiple directories 112, with each directory 112 corresponding to a group of customers. Preferably, the groups of customers are arranged logically; for example, all of the users within a single company or other organization can be organized into the same group. The processor 108 is configured to receive information from the packet-switching network 106 and query the directory 112 for additional information, based on the information that the processor 108 receives from the packet-switching network 106.

The processor 108 includes, and/or communicates with, one or more object storage databases 110. The processor 108 may communicate with the application call processing (ACP) system 130 directly, as shown in FIG. 1, or through a gatekeeper or other suitable device for interfacing a packet-switching network and a conventional telephony network.

Other functions of the processor 108 may include, but are not limited to, controlling scripting, receiving and processing acceptance codes (e.g., dual tone multi-frequency (DTMF) codes, discussed in U.S. Pat. No. 5,787,150, for example), message and control handling (e.g., initiating and stopping recording of messages, tracking where messages are stored, controlling user options, and controlling message options), serving as a proxy server to the directory 112, processing communications to and from the ACP 130, querying the directory 112 for information, generating an alarm signal when errors in call processing are detected, controlling redundancy if multiple directories 112 are used, and authenticating users who wish to gain access to the virtual PBX system 100. Additionally, the processor 108 automatically stores billing information for various customers, generates billing reports at specified time intervals for each customer, and delivers the billing reports to respective of the customers.

The object storage databases 110 store, organize, and sort information for the users of the virtual PBX system 100. The information stored in the object storage database 110 includes voice messages, e-mail, faxes, images, documents, and any other information that a user desires to store and access with the data devices 102 and 104.

The directory 112 receives queries from the processor 108, accesses the directory database 114, and uses information received from the processor 108 to cross reference additional information about users stored in records and the directory database 114. Information that the directory 112 retrieves from the directory database 114 is sent to the processor 108. Thus, the directory 112 performs functions such as determining the terminal points where a user can be reached, determining the user's PBX extension, and/or a network address of a data device. This information is sent to the processor 108 from the directory 112 on the basis of queries received from the processor 108.

The directory 112 can also perform all or some of the functions performed by the processor 108. Likewise, the processor 112 can perform all or some of the functions performed by the directory 112. Thus, it is not necessary to have both a processor and a directory. As shown in FIG. 1, the directory 112 can communicate with the packet-switching network 106 and the ACP system 130 as well as the processor 108. As a result, processing can be distributed between the processor 108 and the directory 112 in any desired manner.

The directory database 114 stores records that associate users' aliases with their PBX extensions, group ID numbers, network addresses, and the one or more locations corresponding to each user's PBX extension.

The traditional telephony network 116 includes one or more PBXs 118, telephones 120, a PSTN 122, fax machines 124, modems 126, one or more packet network telephony gateways 128, and one or more ACP systems 130.

The PBX 118 is any conventional PBX, and the PSTN 122 is any conventional PSTN. Conventional PBXs and PSTNs are described in Keiser and Strange, "Digital Telephony and Network Integration," $2^{nd}$ ed. and in Stallings, "Data and Computer Communications," $4^{th}$ ed. The telephones 120 are conventional and are connected to, and communicate with, the PBX 118 and the PSTN 122. The fax machines 124 and the modems 126 are conventional and are also connected to the PSTN 122.

The packet network telephony gateway 128 connects the packet-switching network 106 to the PBX 118 and the PSTN 122. The packet network telephony gateway 128 receives information from the packet-switching network 106 and converts the information to a form compatible with the PBX 118 and/or the PSTN 122. The packet network telephony gateway 128 also receives information from the PBX 118 and the PSTN 122 and converts such information into a form compatible with the packet-switching network 106. Thus, the packet network telephony gateway 128 serves as an interface between the packet-switching network 106 of the virtual PBX system 100 and the conventional telephony system 116. The packet network telephony gateway 128 may be an H.323 gateway PC, such as that described in http:H/quicknet.net/support/AppNotes/AN00004.htm. The packet network telephony gateway 128 may include a gatekeeper or other device or software for interfacing a packet-switching network and a conventional telephony system.

The ACP system 130 is any known ACP system for controlling processes such as collect call and messaging for example. One such ACP system is described in U.S. Pat. No. 5,787,150 to Reiman et al., entitled "Method and System for Automated Collect Call Messaging," which is incorporated by reference herein. The ACP system 130 automatically processes calls received via the PSTN 122 and connects calls to the processor 108 and/or the directory 112 of the virtual PBX system 100.

It is emphasized that the virtual PBX system 100 of FIG. 1 is for exemplary purposes only, as many variations and permutations of the hardware used to implement the present invention will be readily apparent to one having ordinary skill in the art. To implement these variations, a single computer (e.g., the computer 1000 of FIG. 10) may be programmed to perform the special purpose functions of two or more of any of the devices shown in FIG. 1. For example, a single computer could be programmed to function as both the processor 108 and the directory 112. On the other hand, by using distributed processing techniques, for example, two more programmed computers, may be substituted for any one of the devices shown in FIG. 1.

The present invention stores information relating to the users of the virtual PBX system 100. This information includes the users' PBX extensions, aliases, IP addresses, and the locations of different terminal points for each user extension, as well as the order of preference that the terminal points are to be accessed or dialed. This information is stored in one or more memories such as a hard disk, optical disk, magneto-optical disk, and/or random access memory (RAM), for example. One or more databases, such as the storage object database 110 and/or the directory database 114, may store the information used to implement the present invention. The databases are organized using data structures (e.g., records, tables, arrays, fields, and/or lists) contained in a memory such as a hard disk, optical disk, magneto-optical disk, and/or RAM, for example.

Figure 4:
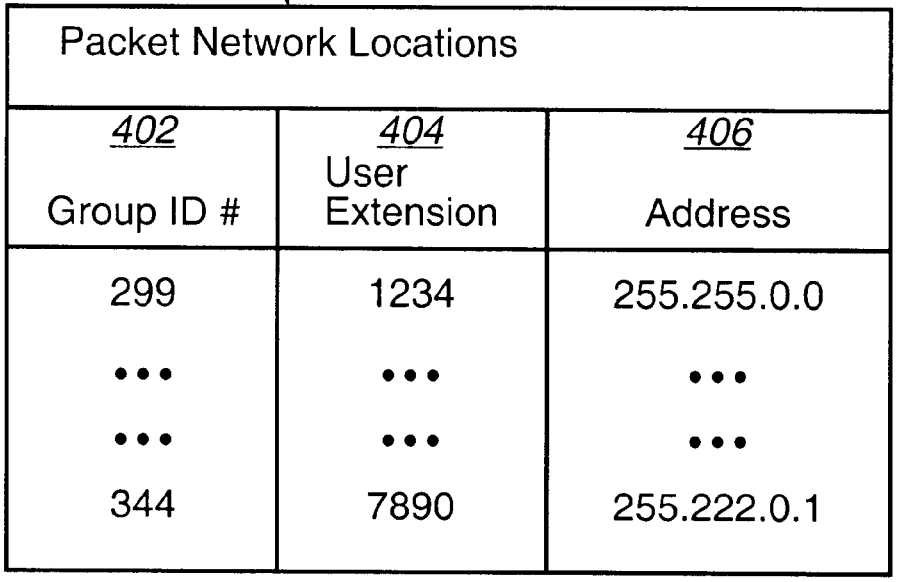
FIG. 4 is a packet network locations record for dynamically tracking and associating the group ID number, the user extension, and the network address of users that are logged onto the virtual PBX system of FIG. 1.

FIGS. 2–4 depict data structures for implementing a virtual PBX system. These data structures are used by the processor 108 and the directory 112 of the virtual PBX system 100 to perform automatic switching, call routing, and other operations similar to those performed on a conventional PBX. The data structures shown in FIGS. 2–4 are stored in the object storage database 110, the directory database 114, and/or any other suitable storage device. The information stored in the data structures includes identifiers for uniquely identifying users and linking users to their PBX extensions, group ID numbers, and terminal points, as well as for dynamically tracking the network addresses of the data devices of users that are logged onto the virtual PBX system 100 via the IP address of the data devices.

FIG. 2 shows an extension aliases record 200 that includes a field 202 for storing aliases, a field 204 for storing group ID numbers, and a field 206 for storing users' PBX extensions. An alias is an identifier that uniquely identifies the user when he or she logs into the virtual PBX system 100. As shown in FIG. 2, the aliases are e-mail addresses. Alternatively, the aliases are any alphanumeric identifiers such as a telephone numbers, social security numbers, billing account numbers, etc. The group ID numbers are associated with respective of the aliases and identify the group corresponding to each alias. The extension identifies the user's virtual PBX extension, which is analogous to an extension in a conventional PBX system. The field 204 for storing the group ID numbers does not have to be used. However, the use of group ID numbers permits users in different groups to have the same PBX extension numbers.

FIG. 3 is an extension locations record 300 that includes a field 302 for storing group ID numbers, a field 304 for storing user extensions, a field 306 for storing location orders, and a field 308 for storing terminal point locations. The group ID numbers and the user extensions are the same as the group identification numbers and the users extensions stored in the fields 204 and 206, respectively, of the extension aliases record 200. The location order is the order of preference that the processor 108 will use in attempting to connect calls to the terminal point locations associated with a user. The terminal point locations are stored in field 308. Thus, referring to the extension locations record 300 shown in FIG. 3 by way of example, if the processor 108 tries to connect a call to a user with the group ID number 299 and the user extension 1234, the processor 108 will first attempt to reach the user via the packet-switching network 106 because the "packet network" entry corresponds to the first terminal point location. If attempts to reach the user via the packet-switching network 106 fail, the processor 108 will then try to connect the call to the user via the number 555-111-2222, because 555-111-2222 corresponds to the second terminal point location for the user. Note that 555-111-2222 is a conventional telephone number to be used in the conventional telephone network 116 of FIG. 1, for example. Other examples of locations include voice mail directories, the receptionist in the building of the user to, be called, the user's secretary, the user's supervisor, and/or a voice mail system.

FIG. 4 shows a packet network locations record 400 that includes a field 402 for storing group ID numbers, a field 404 for storing user extensions, and a field 406 for dynamically storing the network address of the user. The group ID numbers and the user extensions are the same as those stored in the fields 204 and 206, respectively, of the extension aliases record 200 shown in FIG. 2. The network address is the address associated with the data devices (e.g., the data devices 102 and 104 in FIG. 1) connected to the packet-switching network on which the virtual PBX system is implemented. In the examples shown in FIG. 4, the network addresses are IP addresses, and thus, the Internet can be used as the packet-switching network 106. The presence of a network address in the field 406 corresponding to a particular group ID number in field 402 and a particular user extension in the field 404 indicate that the user associated with that group ID number and user extension number are logged onto the virtual PBX system (i.e., that user is "online"). The absence of an address in the field 406 indicates that the user associated with the corresponding group ID number in field 402 and the corresponding user extension in field 404 is not logged into the virtual PBX system 100 (i.e., that user is "offline").

Accordingly, when a user logs in, an entry corresponding to the user's network address (e.g., the IP address of the user's data device) is created in the packet network locations record 300 and associated with the user's virtual PBX extension and group ID number. In this manner, the present invention is able to dynamically track the locations of users of the virtual PBX system 100 by storing the network address of the data device through which the user has logged onto the virtual PBX system 100. As an example of the flexibility and convenience that the virtual PBX 100 of the present invention provides, a user could (1) participate in a telephone conference using the data device 102, which may be located in the user's office, (2) disconnect from the conference, and (3) log in using the data device 104, which may be located in the user's automobile.

It is to be understood that the data structures shown in FIGS. 2–4 are provided by way of example, and many variations and permutations of the organization of the information used by the present invention will be readily apparent to one having ordinary skill in the art. For example, a separate record may be used to link users' aliases to their group ID numbers. In that case, separate extension alias records, extension locations records, and packet network locations records can be created for each group and populated only with information for the corresponding group. Additionally, if each user has a unique user extension number, then the group ID numbers can be eliminated entirely.

Figure 5:
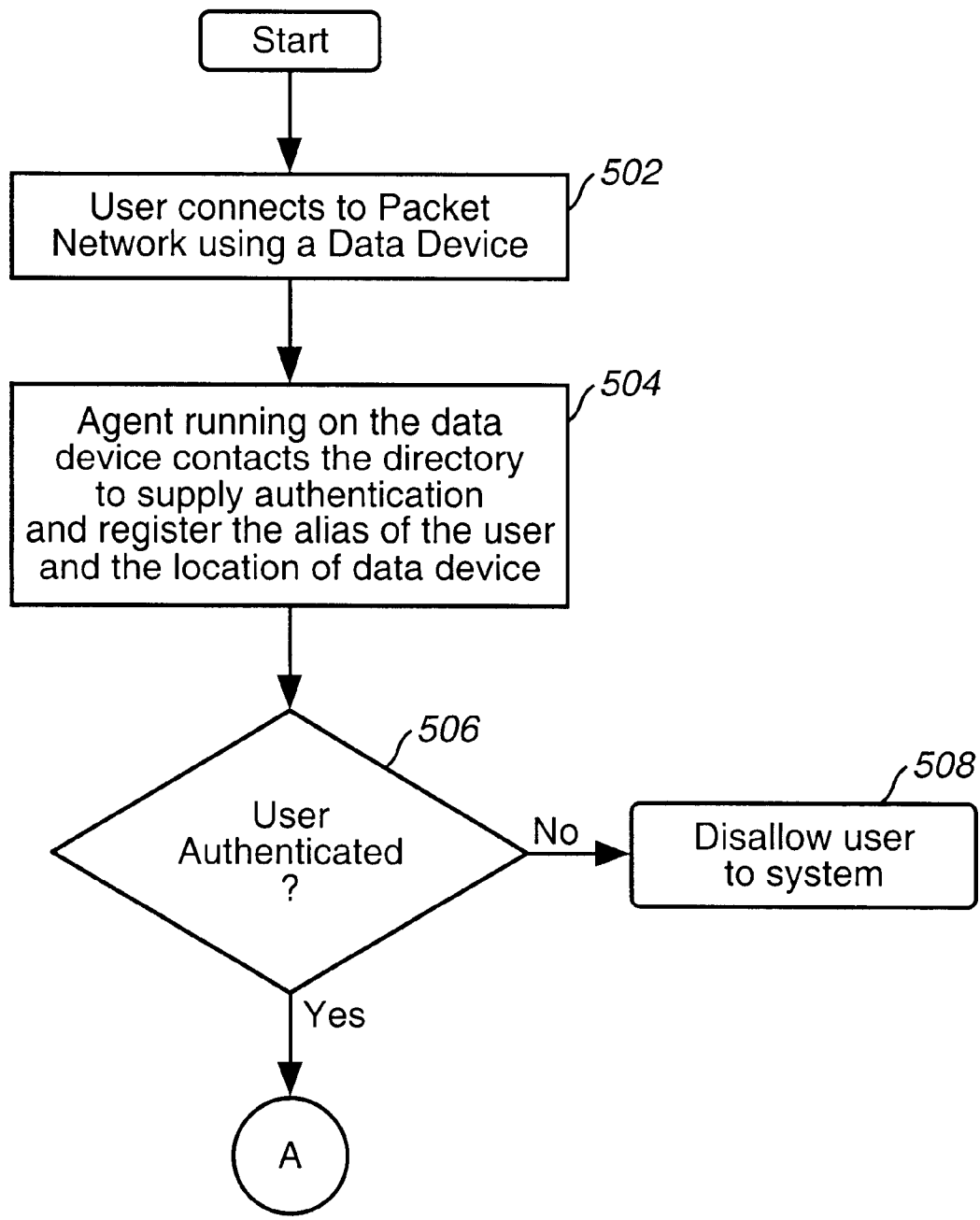
FIG. 5 is a flow chart showing how a user logs onto the virtual PBX system of FIG. 1.

FIG. 5 is a flow chart explaining how a user logs onto the virtual PBX system 100. In step 502 the user connects to the packet-switching network 106 using a data device, such as the data device 102. This connection can be accomplished using known network protocols. In step 504, the agent 103 running on the data device contacts the directory 112 to supply authentication, register the user's alias, and register the location of the data device. The authentication, alias, and location can be input manually by the user. However, the alias and authentication are preferably input by the user, and the location (e.g., the IP address of the data device 102) is sent by the agent 103 to the directory 112 via the packet-switching network 106 automatically. The authentication is preferably a password that the directory 112 compares to passwords stored in the directory database 114. If there is a match between the authentication passwords sent by the agent 103 and one of the authentication passwords in the directory database 114, then the user is authenticated (step 506). If there is no match, then the user is disallowed to the virtual PBX system 100 in step 508.

If the user successfully logs in, the network address (e.g., the IP address) of the data device that the user has connected to the virtual PBX system is linked to the virtual PBX extension of the user. As noted above, users are not required to maintain static locations and can log onto the system on different data devices while maintaining the same user extension.

Figure 6:
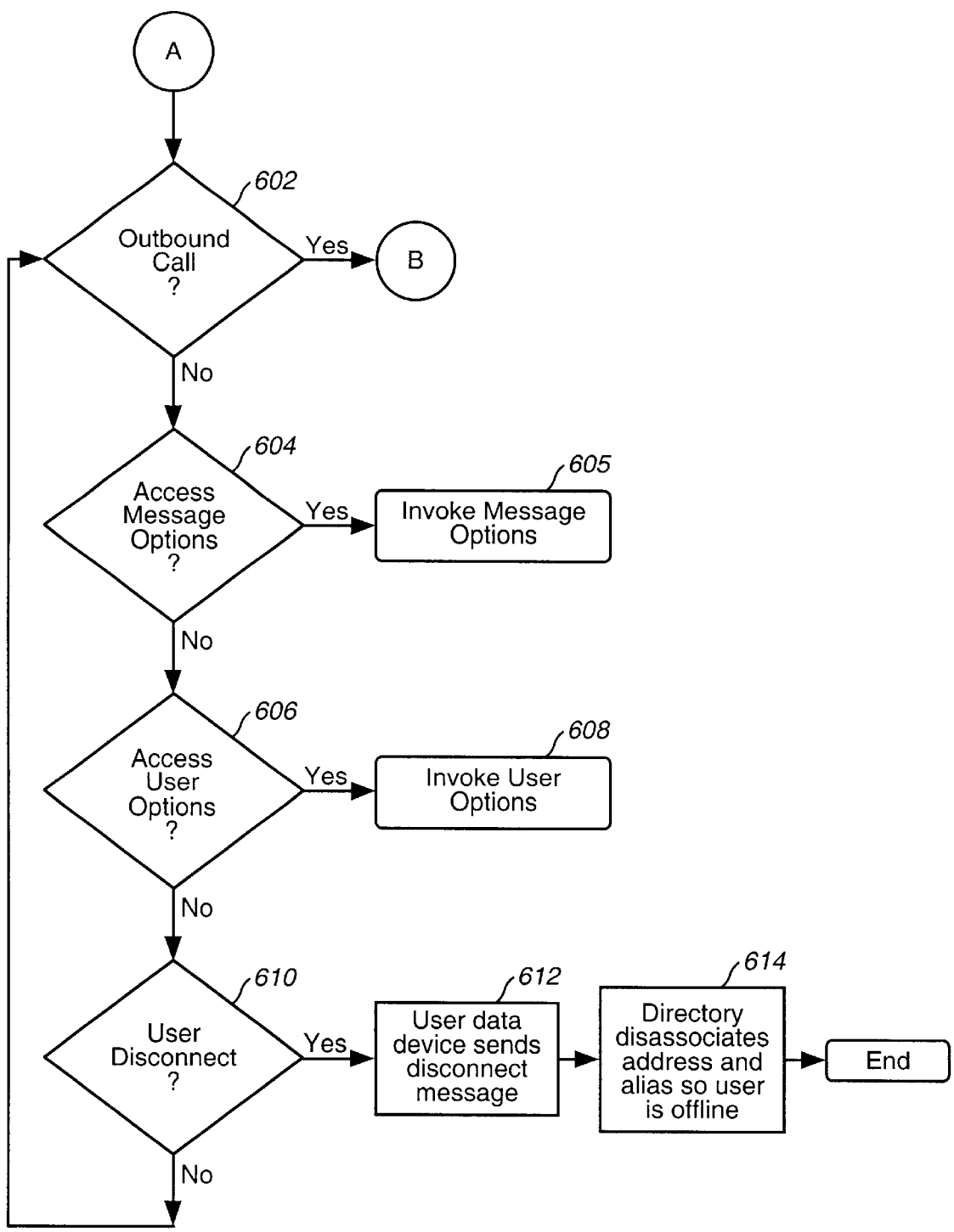
FIG. 6 is a flow chart for explaining different user options that are available with the virtual PBX system of FIG. 1.

FIG. 6 is a flow chart showing the processing of different options available to a user logged onto the virtual PBX system 100. The process shown in FIG. 6 is preferably performed by the processor 108, but alternatively, a portion of the processing can be performed by the directory 112. In step 602 the processor 108 checks to determine whether the user, who is logged into the system, wishes to make an outbound call. If the user wishes to make an outbound call, then the process proceeds to step 702 shown in FIG. 7. Referring back to FIG. 6, if the user does not wish to make an outbound call, the processor determines whether the user wishes to access his or her message options in steps 604. If the user wishes to access his or her message options, then the process proceeds to step 605 and message options are invoked. These message options include standard message options available on a conventional telephone network, such as voice mail, message forwarding, reminders, or any other known message options.

If the user does not wish to access message options in step 604, then the process it proceeds to step 606. In step 606, the processor 108 determines whether the user wishes to access user options. If the user wishes to access user options, then user options are invoked in step 608. User options include standard user options such as storing a greeting message, changing the greeting message, setting the number of rings before an incoming caller is forwarded to voice mail, or any known features or options used in a conventional telephony system. Additionally, the user may be permitted to change the location order (stored in the field 306 in FIG. 3) associated with his or her user extension in the extension locations record 300. If the user does not wish to access user options in step 606, then the processor determines whether the user wishes to disconnect or log off in step 610. If the user wishes to disconnect, then in step 612, the data device 102 sends a disconnect message to the directory 112. Then, in step 614, the directory uses the user's alias, provided at log in, to find the group ID and extension corresponding to the user and locate the user's network address in the packet network locations table 400. Then, the network address is disassociated from the user's group ID number, virtual PBX extension, and alias. As a result, the user is logged off and is deemed to be offline.

If the processor determines in step 610 that the user has not disconnected, then steps 602, 604, 606, and 610 are repeated until the processor 108 determines that the user wishes to make an outbound call, access message options, access user options, or disconnect.

Figure 7:
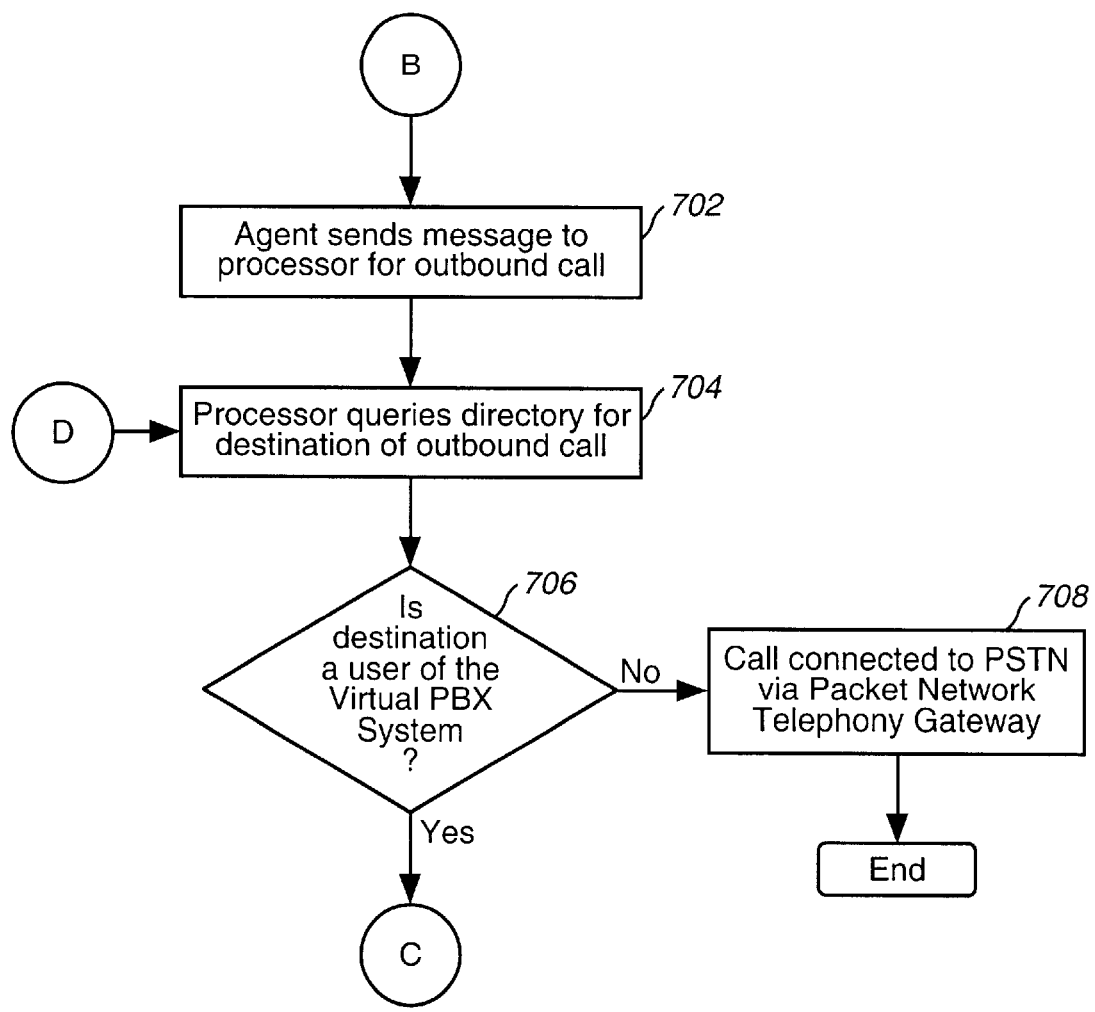
FIGS. 7 and 8 are flow charts explaining the process for making a call from the virtual PBX system to another user via a conventional PSTN or via the virtual PBX system.
Figure 8:
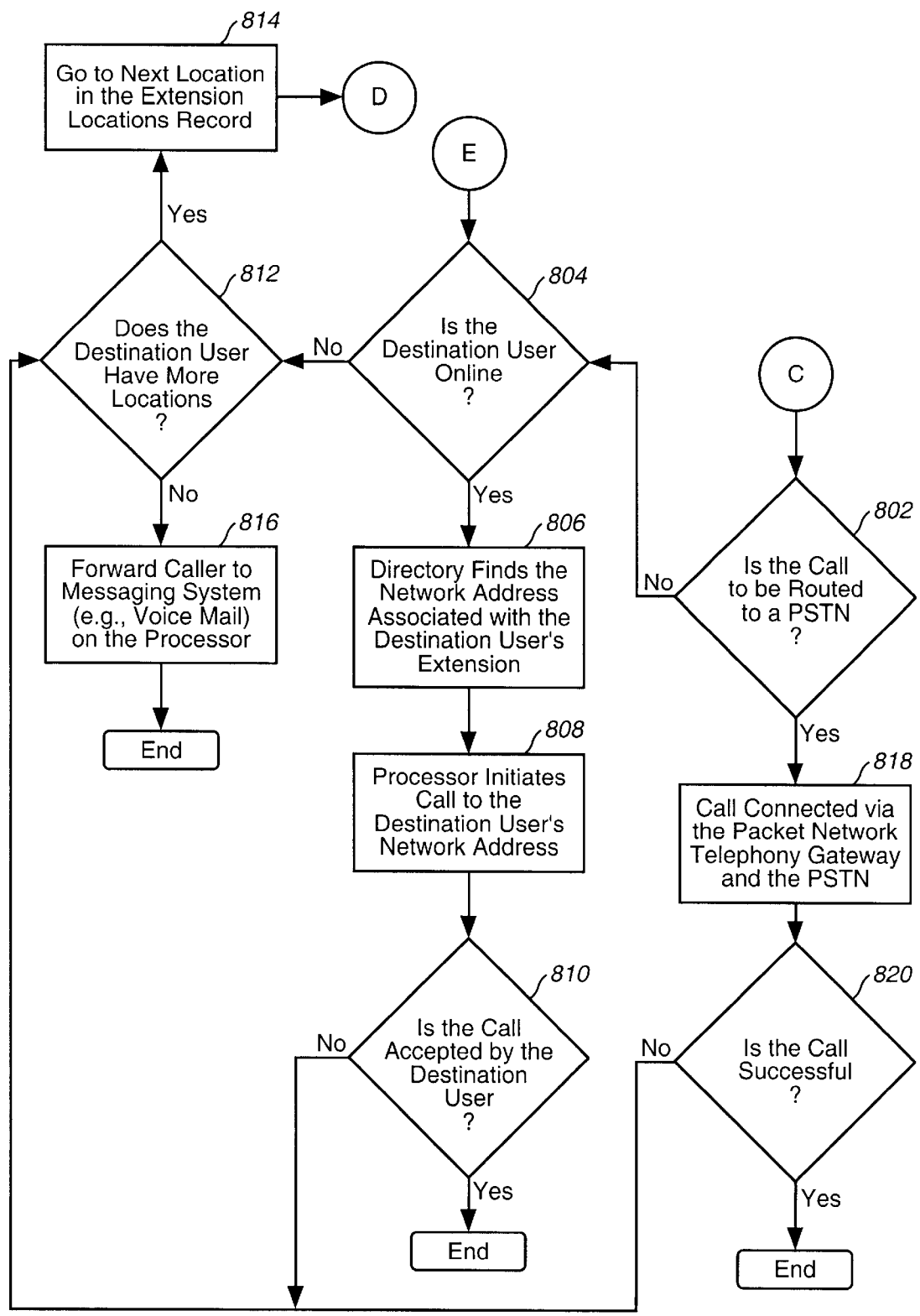

FIGS. 7 and 8 are flow charts for explaining how an outbound call is made. If a user wishes to make an outbound call in step 602 (FIG. 6), then the agent 103 sends a message to the processor 108 to make an outbound call in step 702. Then, in step 704, the processor 108 queries the directory 112 for the destination of the call. In step 706, the directory 112 determines whether the destination of the call is an internal user (i.e., a user of the virtual PBX or a user with an alias). If the destination is not an internal user, then the call is connected to the PSTN 122 via the packet network telephony gateway 128 in step 708. If the destination of the call is an internal user, then the directory 112 determines whether the destination is to a PSTN in step 802 (FIG. 8) by accessing the first terminal point location for the destination user in the extensions locations record 300. The locations stored in the field 308 (FIG. 3) indicate whether the destination user will first be attempted to be contacted on the packet-switching network 106 or the conventional telephony system If the destination is not to a PSTN, then the process proceeds to step 804. In step 804 the directory determines whether the destination user is online by determining whether an IP address is associated with the destination user's virtual PBX extension in the packet network locations record 400. If an IP address is associated with the destination user's virtual PBX extension, then the destination user is determined to be online. If the destination user is online, then in step 806 the directory accesses the packet network locations record 400 to find the network address of the destination user's data device. The destination network address is sent to the processor 108, which initiates the call to that network address in step 808. Then, the processor 108 determines whether the destination user accepts the call in step 810. If the destination user does not accept the call, then the processor 108 notifies the directory 112, and the directory 112 determines whether the destination user has more terminal point locations in the extension locations record 300 in step 812. If the destination user has more locations, then the director 112 selects the next location, based on the location order in the extension locations table 300, in step 814, and the process returns to step 704. Similarly, if the destination user is determined to be offline in step 804, then the process proceeds to step 812 to determine whether the user has additional terminal point locations. If the user has no more terminal point locations, then the step 816, the caller is forwarded to the destination users voice mail system on the processor 108. Voice messages are stored in the object database 110.

If, in step 802, the directory 112 determines that the destination is to the PSTN 122, often the process proceeds to step 818. In step 818 the processor 108 connects the call to the PSTN 122 via the packet network telephony gateway 128. Then, in step 820 the processor 108 determines whether the call was successful. If the call was not successful then the process proceeds to step 812 to determine whether the destination user has more terminal point locations in the extension locations record 300.

Figure 9:
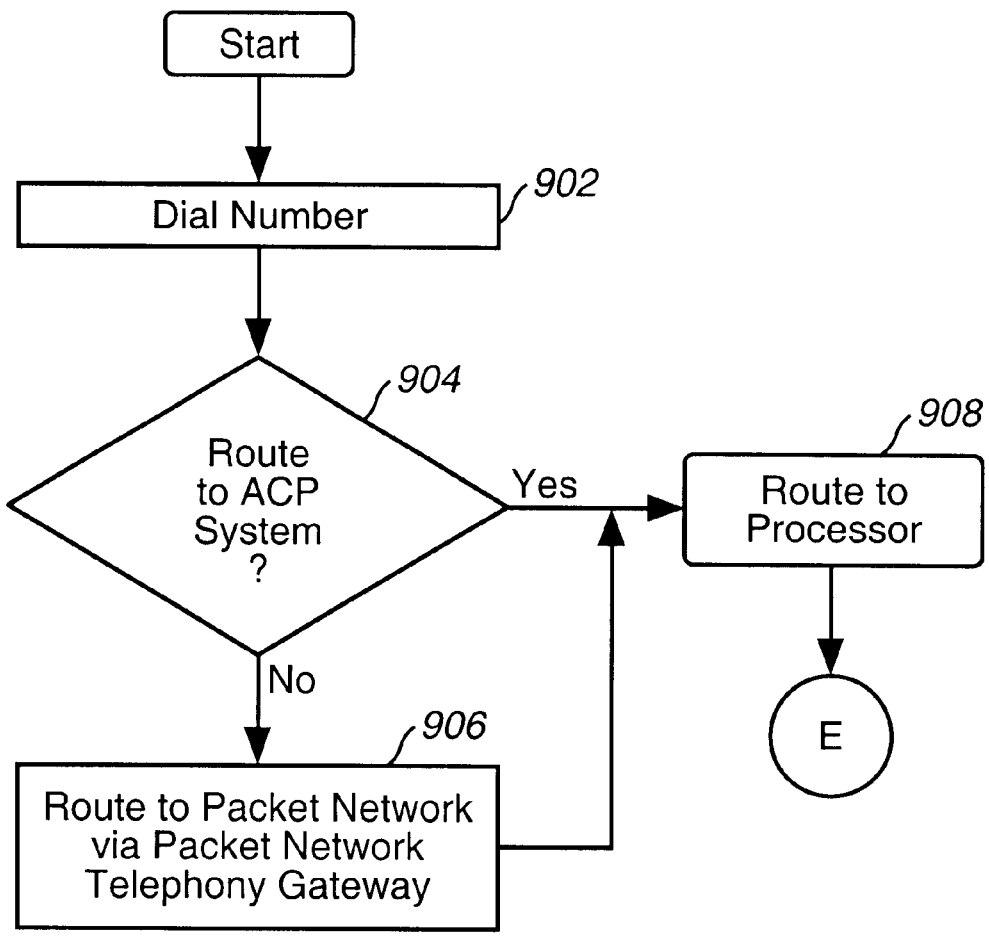
FIG. 9 is a flow chart explaining the process for receiving a call from an outside user with the virtual PBX system of FIG. 1.

FIG. 9 is a flow chart showing how calls can be made through the PSTN network 122 to the data devices 102 and 104 of the virtual PBX system 100. In step 902, a user dials a number corresponding to another user at a data device (e.g., the data device 102) of the virtual PBX system. For example, the user at the telephone 120 dials the number corresponding to the user at the data device 102. Upon dialing the number in step 902, the telephone 120 is connected to the PSTN 122, directly or through the PBX 118, depending on whether the telephone 120 is required to access the PSTN 122 through the PBX 118. In step 904, the PSTN 122 determines whether to route the call to the ACP system 130 or to the packet network telephony gateway 128. If the PSTN 122 routes the call to the ACP system 130, then in step 908, the call is routed directly to the processor 108 or alternatively, to the directory 112. If the PSTN 122 routes the call to the packet network telephone gateway 128, then in step 906, the call is routed to the processor 108 (or alternatively, the directory 112) via the packet-switching network 106.

As shown in FIGS. 5–9, call processing and switching within the virtual PBX system 100 is performed by the processor 108 and directory 112, and therefore, the intelligence of the virtual PBX system 100 is advantageously located on the network side, and not in the terminal devices (i.e., not within the data devices 102 and 104). Moreover, since the call processing and switching is performed by the processor 108 and the directory 112, there is no need for conventional telephony equipment for call routing within the virtual PBX network 100.

Additionally, the interface between the packet network telephony gateway 128 and the virtual PBX system 100 and the ACP system 130 provides connectivity between the virtual PBX system of the present invention and existing PSTNs and PBXs.

All or a portion of the invention may be conveniently implemented using conventional general purpose computers or microprocessors programmed according to the teachings of the present invention, as will be apparent to those skilled in the computer art. Appropriate software can be readily prepared by programmers of ordinary skill based on the teachings of the present disclosure, as will be apparent to those skilled in the software art.

Figure 10:
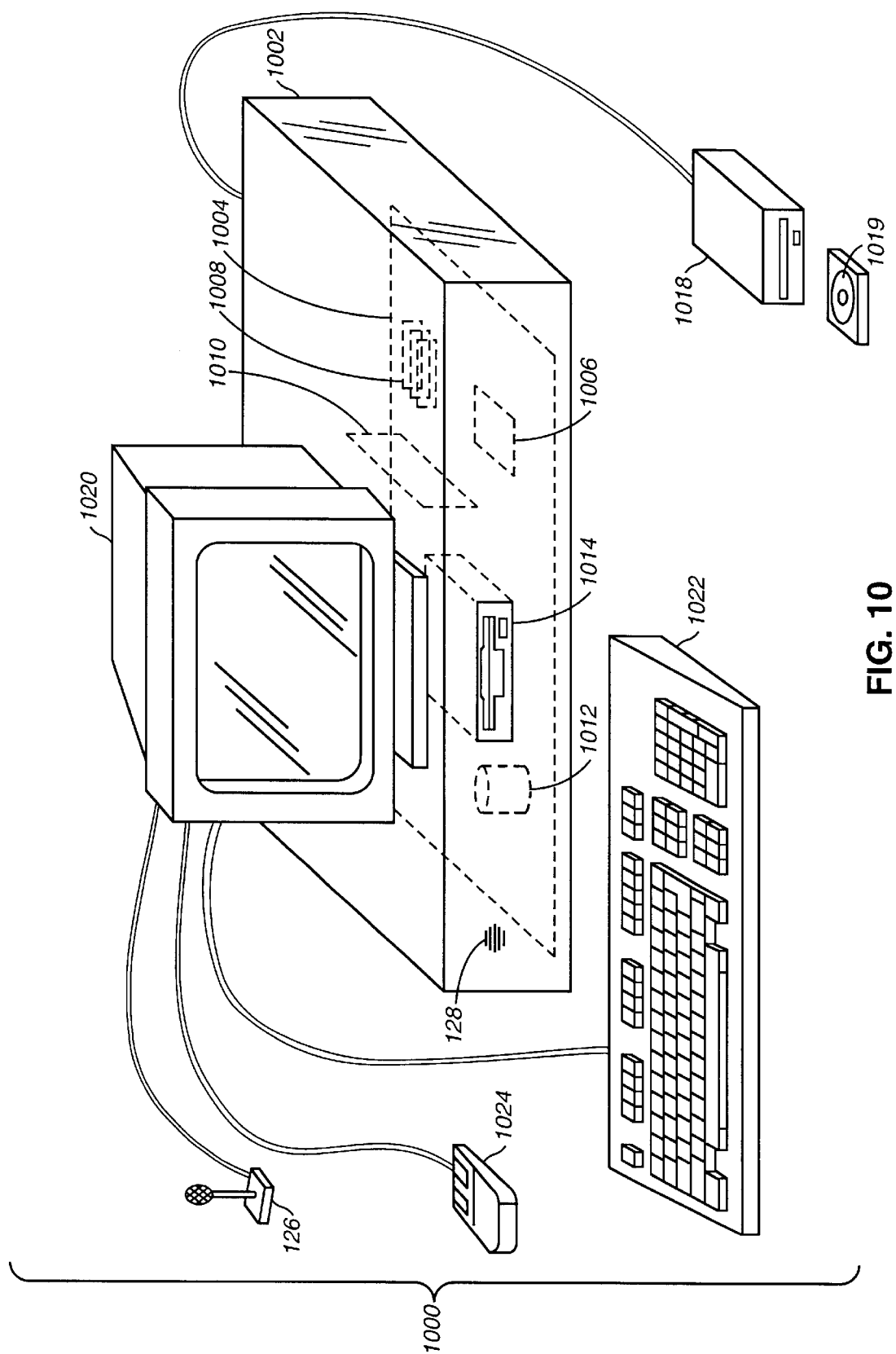
FIG. 10 is a schematic diagram of a general purpose computer system that can be programmed to perform the special purpose function(s) of one of more of the devices shown in the system of FIG. 1.

FIG. 10 is a schematic illustration of a computer system 1000 for implementing the method of the present invention. The computer system 1000 includes a computer housing 1002 for housing a mother board 1004, which contains a CPU 1006, a memory 1008 (e.g., RAM, dynamic RAM (DRAM), static RAM (SRAM), synchronous DRAM (SDRAM), flash RAM, read-only memory (ROM), programmable ROM (PROM), erasable PROM (EPROM), and electrically erasable PROM (EEPROM)), and other optional special purpose logic devices (e.g., application specific integrated circuits (ASICs)) or configurable logic devices (e.g., generic array of logic (GAL) or reprogrammable field programmable gate arrays (FPGAs)). The computer system 1000 also includes plural input devices, such as a keyboard 1022, a mouse 1024, and a microphone 126, and a speaker 128 and display card 1010 for controlling a monitor 1020. In addition, the computer system 1000 further includes a floppy disk drive 1014; other removable media devices (e.g., a compact disc 1019, a tape, and a removable magneto-optical media); and a hard disk 1012, or other fixed, high density media drives, connected using an appropriate device bus (e.g., a small computer system interface (SCSI) bus, and enhanced integrated device electronics (IDE) bus, or an ultra-direct memory access (DMA) bus). The computer system 1000 may additionally include a compact disc reader 1018, a compact disc reader-writer unit, or a compact disc juke box, each of which may be connected to the same device bus or another device bus. Although the compact disc 1019 is shown in a CD caddy, the compact disc 1019 can be inserted directly into CD-ROM drives which do not require caddies. In addition, a printer may provide printed listings of the data structures shown in FIGS. 2–4 or any other data stored and/or generated by the computer system 1000.

As stated above, the system includes at least one computer readable medium or memory programmed according to the teachings of the invention and for containing data structures, tables, records, or other data described herein. Examples of computer readable media are compact discs, hard disks, floppy disks, tape, magneto-optical disks, PROMs (EPROM, EEPROM, Flash EPROM), DRAM, SRAM, SDRAM, etc. Stored on any one or on a combination of computer readable media, the present invention includes software for controlling both the hardware of the computer 1000 and for enabling the computer 1000 to interact with a human user (e.g., a consumer). Such software may include, but is not limited to, device drivers, operating systems and user applications, such as development tools. Such computer readable media further includes the computer program product of the present invention for performing all or a portion (if processing is distributed) of the processing performed in implementing the invention. The computer code devices of the present invention can be any interpreted or executable code mechanism, including but not limited to scripts, interpreters, dynamic link libraries, Java classes, and complete executable programs. Moreover, parts of the processing of the present invention may be distributed for better performance, reliability, and/or cost.

The invention may also be implemented by the preparation of application specific integrated circuits or by interconnecting an appropriate network of conventional component circuits, as will be readily apparent to those skilled in the art.

Obviously, numerous modifications and variations of the present invention are possible in light of the above teachings. It is therefore to be understood that within the scope of the appended claims, the invention may be practiced otherwise than as specifically described herein.

What is claimed is:

1. A method of routing calls within a packet-switching network, comprising the steps of:
   receiving from a data device login information including an alias identifying a user at the data device and a network address identifying the location of the data device on the packet-switching network;
   associating a private branch exchange extension of the user with the network address;
   receiving a call to the user's private branch exchange extension; and
   routing the received call to the data device on the basis of the network address of the data device.

2. A method according to claim 1, further comprising the steps of:
   associating an alias identifying the user with the user's private branch exchange extension.

3. A method according to claim 2, wherein the step of associating the user's private branch exchange extension with the network address comprises the step of:
   linking the user's private branch exchange extension to the network address of the data device in response to receiving the user's alias.

4. A method according to claim 1, further comprising the step of:
   receiving from the data device a disconnect command indicating that the user desires to log off of the packet-switching network.

5. A method according to claim 4, further comprising the step of:
   disassociating the network address from the user's private branch exchange extension in response to receiving the disconnect command.

6. A method according to claim 5, further comprising the step of:
   receiving from another data device other login information including the alias identifying the user at the other device and another network address identifying the location of the other data device on the packet-switching network;
   associating a private branch exchange extension of the user with the other network address;
   receiving another call to the user's private branch exchange extension; and
   routing the other call to the other data device on the basis of the other network address of the other data device.

7. A method according to claim 2, further comprising the step of:
   receiving the user's alias from different data devices connected to the packet-switching network at different times;
   tracking locations of the user on the packet-switching network on the basis of the respective network addresses of the different data devices; and
   routing calls to the one of the different data devices from which the user's alias was last received.

8. A virtual private branch exchange system implemented on a packet-switching network, comprising:
   means for receiving from a data device login information including an alias identifying a user at the data device and a network address identifying the location of the data device on the packet-switching network;
   means for associating a private branch exchange extension of the user with the network address;
   means for receiving a call to the user's private branch exchange extension; and
   means for routing the received call to the data device on the basis of the network address of the data device.

9. A virtual private branch exchange system according to claim 8, further comprising:
   means for associating an alias identifying the user with the user's private branch exchange extension.

10. A virtual private branch exchange system according to claim 9, wherein the means for associating the user's private branch exchange extension with the network address, comprises:
    means for linking the user's private branch exchange extension to the network address of the data device in response to receiving the user's alias.

11. A virtual private branch exchange system according to claim 8, further comprising:
    means for receiving from the data device a disconnect command indicating that the user desires to logoff of the packet-switching network.

12. A virtual private branch exchange system according to claim 11, further comprising:
    means for disassociating the network address from the user's private branch exchange extension in response to receiving the disconnect command.

13. A virtual private branch exchange system according to claim 12, further comprising:
    means for receiving from another data device other login information including the alias identifying the user at the other device and another network address identifying the location of the other data device on the packet-switching network;
    means for associating a private branch exchange extension of the user with the other network address;

means for receiving another call to the user's private branch exchange extension; and means for routing the other call to the other data device on the basis of the other network address of the other data device.

14. A virtual private branch exchange system according to claim 9, further comprising:

means for receiving the user's alias from different data devices connected to the packet-switching network at different times;

means for tracking locations of the user on the packet-switching network on the basis of the respective network addresses of the different data devices; and means for routing calls to the one of the different data devices from which the user's alias was last received.

15. A virtual private branch exchange system implemented on a packet-switching network, comprising:

a memory configured to store information associating a user with a private branch exchange extension of the user;

a directory unit configured to receive from a data device login information including an alias identifying the user at the data device and a network address identifying the location of the data device on the packet-switching network, configured to access the memory to associate a private branch exchange extension of the user with the network address, configured to process information of a received call, the information including the user's private branch exchange extension, and configured to route the received call to the data device on the basis of the network address of the data device.

16. A virtual private branch exchange system according to claim 15, wherein the memory is further configured to store information associating an alias identifying the user with the user's private branch exchange extension.

17. A virtual private branch exchange system according to claim 16, wherein the directory unit is further configured to link the user's private branch exchange extension to the network address of the data device in response to receiving the user's alias.

18. A virtual private branch exchange according to claim 16, wherein the directory unit is further configured to receive the user's alias from different data devices connected to the packet-switching network, configured to track locations of the user on the packet-switching network on the basis of the respective network addresses of the different data devices, configured to process other information of another received call, the other information including the user's private branch exchange extension, and configured to route the other received call to the one of the different data devices from which the user's alias was last received.

19. A computer readable medium storing program instructions for execution on a computer system, which when executed by a computer, cause the computer to perform the steps of:

receiving from a data device login information including an alias identifying a user at the data device and a network address identifying the location of the data device on the packet-switching network;

associating a private branch exchange extension of the user with the network address;

receiving a call to the user's private branch exchange extension; and routing the received call to the data device on the basis of the network address of the data device.

20. A computer readable medium according to claim 19, further comprising program instructions for causing the computer to perform the steps of:

associating an alias identifying the user with the user's private branch exchange extension.

21. A method according to claim 20, wherein the step of associating the user's private branch exchange extension with the network address, comprises the step of:

linking the user's private branch exchange extension to the network address of the data device in response to receiving the user's alias.

22. A computer readable medium according to claim 19, further comprising program instructions for causing the computer to perform the steps of:

receiving from the data device a disconnect command indicating that the user desires to logoff of the packet-switching network.

23. A computer readable medium according to claim 19, further comprising program instructions for causing the computer to perform the steps of:

disassociating the network address from the user's private branch exchange extension in response to receiving the disconnect command.

24. A computer readable medium according to claim 23, further comprising program instructions for causing the computer to perform the steps of:

receiving from another data device other login information including the alias identifying the user at the other device and another network address identifying the location of the other data device on the packet-switching network;

associating a private branch exchange extension of the user with the other network address;

receiving another call to the user's private branch exchange extension; and routing the other call to the other data device on the basis of the other network address of the other data device.

25. A computer readable medium according to claim 20, further comprising program instructions for causing the computer to perform the steps of:

receiving the user's alias from different data devices connected to the packet-switching network at different times;

tracking locations of the user on the packet-switching network on the basis of the respective network addresses of the different data devices; and routing calls to the one of the different data devices from which the user's alias was last received.

26. A memory for storing information for implementing a virtual private branch exchange on a packet-switching network, comprising a data structure including:

a field for storing private branch exchange extensions of users registered with the virtual private branch exchange; and a field for dynamically storing network addresses identifying the respective locations of data devices connected to the packet-switching network, the network addresses being dynamically associated with corresponding of the users' private branch exchange extensions.

27. A memory according to claim 26, further comprising another data structure including:

a field for storing aliases identifying respective of the users, the aliases being linked to corresponding of the users' private branch exchange extensions.

* * * * *